United States Patent [19]
Yerman

[11] 3,743,926
[45] July 3, 1973

[54] FINE LINEARITY CONTROL IN INTEGRAL SILICON TRANSDUCERS

[75] Inventor: Alexander J. Yerman, Scotia, N.Y.

[73] Assignee: General Electric Company, Schenectady, N.Y.

[22] Filed: Apr. 6, 1972

[21] Appl. No.: 241,633

[52] U.S. Cl. ...... 323/75 N, 73/398 AR, 73/88.5 SD, 338/4
[51] Int. Cl. ............................................ G01l 9/04
[58] Field of Search .................................. 338/2, 4; 73/88.5 SD, 398 AR; 323/75 N; 307/308; 179/110; 317/23 SM

[56] References Cited
UNITED STATES PATENTS

| | | | |
|---|---|---|---|
| 3,537,319 | 11/1970 | Yerman | 338/4 X |
| 3,505,874 | 4/1970 | Kato et al. | 73/398 AR |
| 3,434,090 | 3/1969 | Chelner | 338/4 |

*Primary Examiner*—Gerald Goldberg
*Attorney*—John F. Ahern et al.

[57] ABSTRACT

A circular, restrained edge, pressure responsive silicon diaphragm has a fixed pattern of integral central and outer strain gages connected in a full bridge circuit used to measure fluid pressure. A fine adjustment to linearize the bridge output voltage is made by selecting the active diameter of the diaphragm to obtain a predetermined radial position of the outer gages. The resulting bridge resistance change with applied pressure compensates for the nonlinearity of output voltage due to inherent nonlinear mechanical behavior of the diaphragm.

8 Claims, 6 Drawing Figures

Patented July 3, 1973

FINE LINEARITY CONTROL IN INTEGRAL SILICON TRANSDUCERS

BACKGROUND OF THE INVENTION

This invention relates to silicon diaphragms with integral semiconductor strain gages for sensing pressure, and more particularly to a fine mechanical adjustment to obtain a more linear electrical output from the integral silicon transducer.

Integral silicon transducers utilizes a thin circular monocrystalline diaphragm securely mounted at the edges so that the unrestrained central portion is deformed as a function of the pressure applied to it. Semiconductor strain gages of the opposite conductivity type formed integrally on or in the diaphragm exhibit a change in resistance when strained and yield a measure of the applied pressure. A preferred arrangement uses active central and outer gage elements that are respectively subjected to tensile and compressive stresses as the diaphragm bends, thereby producing opposite sense resistance changes that are additive in a bridge circuit. These semiconductor transducers can be fabricated by standard integrated circuit techniques, are capable of being miniaturized, have large gage factors, and give accurate pressure indications. A small source of error, however, results from the nonlinear bending of the diaphragm as the applied pressure changes, with the result that the electrical output voltage of the bridge circuit is also nonlinear. It is difficult to make a purely electrical circuit compensation for this small error in output voltage deriving from the mechanical aspects of the pressure transducer. A fine linearity control is required, nevertheless, for the realization of high quality pressure transducers utilizing integral silicon diaphragms.

SUMMARY OF THE INVENTION

To obtain a fine adjustment for linearity control of the output voltage of such integral silicon transducers with central and outer strain gages arranged in a resistance bridge circuit, it is recognized that the amount of change of the over-all bridge resistance can be controlled by the relative positions of the central and outer gages on the unrestrained diaphragm. Since the central gages usually have a fixed position at or adjacent to the center of the diaphragm, the relative positions of the central and outer gages are altered by selecting the radial positions of the outer gages. It can be shown mathematically that the difference in strains experienced by the central and outer gages ($\epsilon_i + \epsilon_o$) is determinative of the bridge resistance variation with applied pressure. The outer gages are located at radial positions that produce a predetermined bridge resistance variation causing a selected change in output voltage with pressure. This compensates for the nonlinear output voltage due to the inherent mechanical nonlinearity of the diaphragm, and results in a linear output voltage.

It is preferred to fabricate the integral silicon diaphragm with a fixed pattern of strain gages, interconnect areas, and contact pads, and to obtain the desired radial position of the outer gages by thereafter choosing the unrestrained diaphragm radius that achieves this radial position. In the embodiment discussed, the mounting member to which the diaphragm is edge-secured is a tube whose inside diameter is chosen to give the preselected diaphragm radius. Diaphragms for low pressure ranges have a higher degree of mechanical nonlinearity, usually negative, and require more positive sense compensation than diaphragms for higher pressure ranges. The preferred embodiment uses an "in-line" full bridge gage pattern, but the invention is applicable to half bridge circuit arrangements and other gage patterns.

DESCRIPTION OF THE PREFERRED EMBODIMENT

Figure 1:
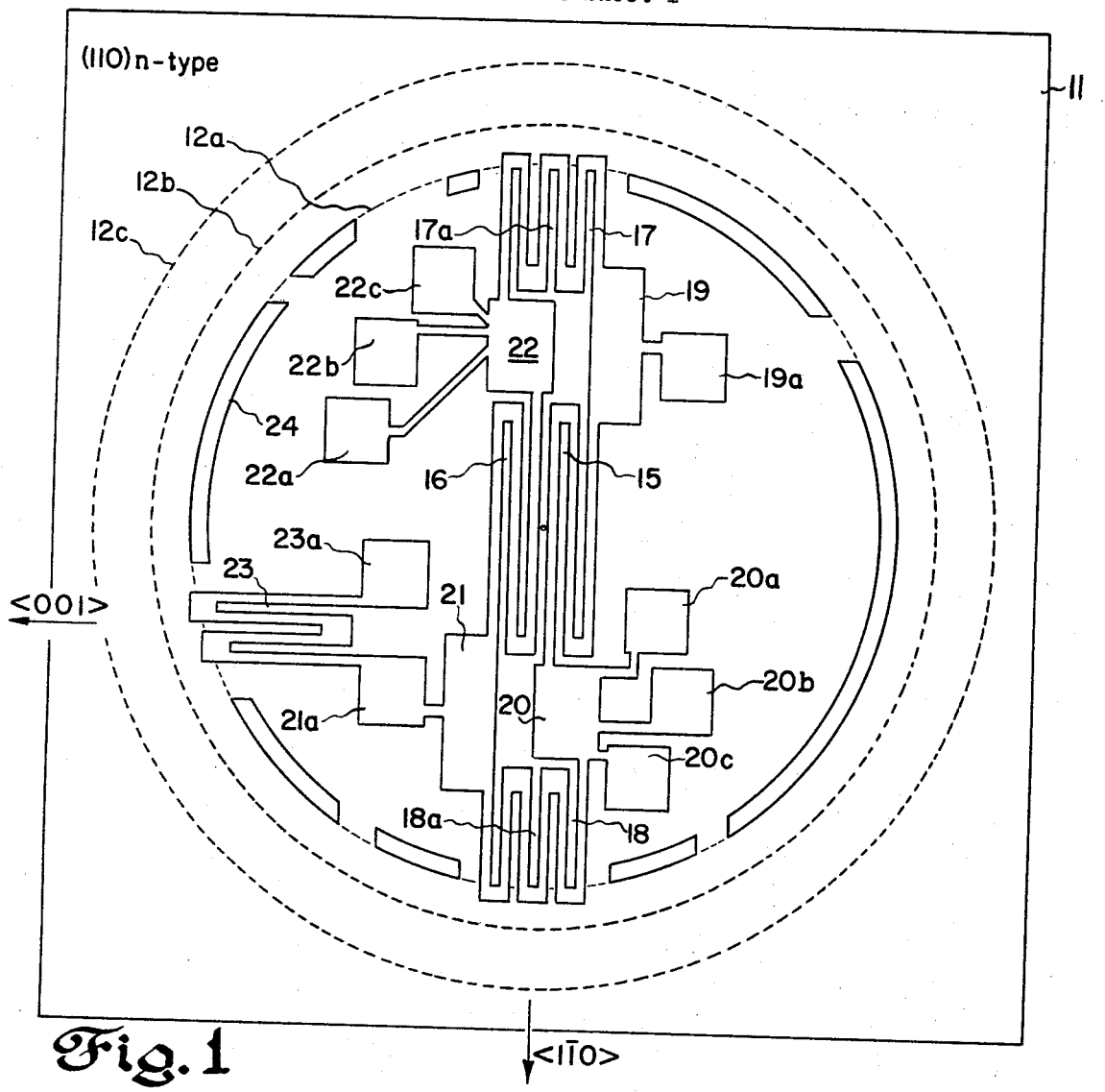
FIG. 1 is a plan view of the integral silicon diaphragm per se showing the individual strain gage elements and other interconnection members in a full bridge pattern, and also an alinement circle.
Figure 2:
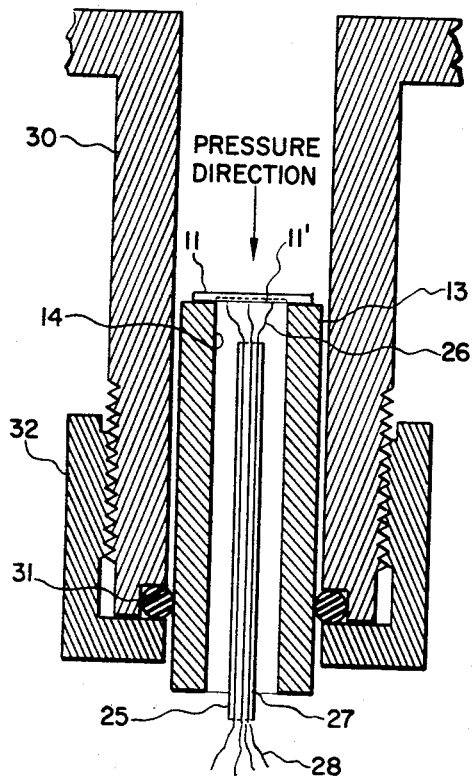
FIG. 2 is a cross-sectional view of a transducer probe assembly mounted in a pressurized housing, in which the probe assembly includes the diaphragm of FIG. 1 secured to the end of a mounting tube with an I.D. selected to obtain fine linearity control.

Referring to FIGS. 1 and 2, a stress responsive diaphragm 11 is preferably made from a thin wafer of (110) plane n-type single crystal semiconductor material. For convenience of manufacture, the single crystal silicon diaphragm 11 has a square shape, but the outer edges of the diaphragm are restrained such that only a circular central portion of the diaphragm is free to flex in response to an applied stress. For this application, the stress is a fluid pressure differential. For reasons to be explained in detail later, the diameter of the active, unrestrained diaphragm depends upon the pressure range being measured, and the minimum diameter is indicated by the dashed line 12a and the maximum diameter by the dashed line 12c. A typical mounting member for pressure responsive diaphragm 11 is a cylindrical tube 13 (FIG. 2) with an inner diameter 14 corresponding to the desired active diaphragm diameter. Silicon diaphragm 11 is secured to the end of mounting tube 13, which has an outer diameter greater than the diagonal dimension of the entire square diaphragm. Pressure transmitted through a fluid in the direction indicated by the arrow acts approximately perpendicularly against the adjacent surface of diaphragm 11, flexing it outwardly in the same direction as a function of the magnitude of the pressure.

A plurality of semiconductor strain gages of opposite conductivity type, i.e., p-type silicon, are formed integrally in or on the outer surface of diaphragm 11 as indicated generally at 11', out of contact with the pressure transmitting fluid. These p-type strain gages are formed on one surface of the n-type substrate 11 by techniques well known in the semiconductor art. There are two central strain gages 15 and 16 located at or adjacent to the center of the active diaphragm, and two outer strain gages 17 and 18 located toward the outer edges of the active diaphragm. Each of the individual strain gages comprises at least one elongated strip of p-type silicon, although as illustrated, each gage can comprise several elongated p-type silicon strips folded back parallel to one another accordian fashion in order to increase the length-to-width ratio and hence resistance of a gage located within a given area of diaphragm 11. All four strain gages are active gages, and all are oriented in the same crystallographic direction in a symmetrical pattern with respect to a chosen diameter. This is known as an "in-line" strain gage pattern. The advantage of the "in-line" gage is that the over-all bridge circuit does not respond to strains generated by a mismatch in temperature coefficient of expansion of diaphragm 11 and mounting tube 13. For further information reference may be made to U.S. Pat. No. 3,697,918 granted on Oct. 10, 1972 to E.D. Orth and A.J. Yerman, and assigned to the same assignee.

The two central gages 15 and 16 are symmetrical with respect to the center of the unrestrained diaphragm and are preferably oriented in a $<1\bar{1}0>$ crystallographic direction. This orientation is most desirable since the sensitivity of p-type silicon semiconductor material to transverse or tangential strain approaches zero while its sensitivity to longitudinal or radial strain is high. Thus, a tangential strain applied to the central gages does not reduce their output or reduces their individual output only negligibly. Exposure of gages 15 and 16 to approximately equal amplitudes of tangential and radial strains as occurs near the diaphragm center consequently reduces sensitivity only a negligible amount. The respective centers 17a and 18a of the two outer gages 17 and 18 are also symmetrical with respect to the center and edges of the unrestrained diaphragm. In the $<1\bar{1}0>$ crystallographic direction, the radial strain sensitivity is high while the tangential sensitivity is relatively low, with the result that the overall sensitivity while not the maximum is still relatively high. The four strain gages 15–18 are connected in a full bridge circuit by means of four relatively low resistance connection areas 19–22. The two opposite low resistance connections 19 and 21 are further respectively connected by a small neck to the contact pads 19a and 21a. A single strain gage element 23 connected between contact pads 21a and 23a is located toward the edge of the active diaphragm and oriented in the $<001>$ crystallographic direction. In this direction the gage is non-strain sensitive and its function is to provide an optional series resistance for temperature compensation purposes (see also FIG. 3). When connected in a Wheatstone bridge configuration, the four active gages 15–18 are respectively variable resistance elements in each of the arms of the bridge, and a source of energy is connected between contact pads 19a and 21a, or between contact pads 19a and 23a if resistance gage element 23 is used. To facilitate the sensing of the unbalance output voltage $e_o$ between the opposite junctures of the bridge circuit, three separate irregularly shaped contact pads or strips 20a–20c are connected to low resistance connection 20, and in similar fashion the contact strips 22a–22c are associated with low resistance connection 22. The unbalance output voltage $e_o$ is sensed between any one of the three pairs of contact strips, with a choice being provided to obtain a closer balance of the bridge. The p-type silicon pattern on diaphragm 11 also incudes a discontinuous alinement circle or marker 24 to facilitate accurate attachment of mounting tube 13.

Figure 3:
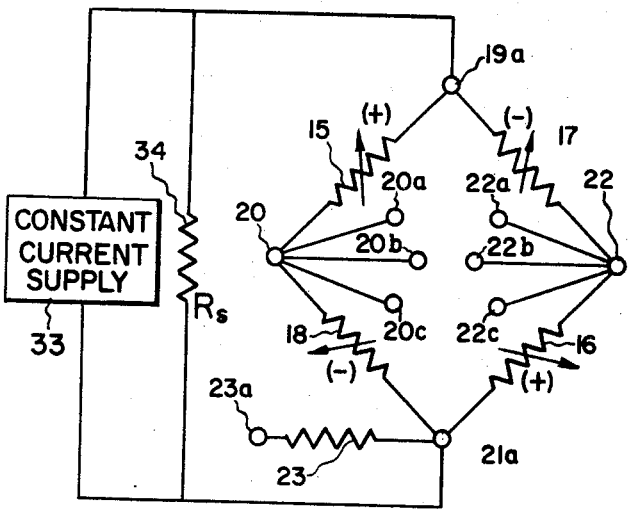
FIG. 3 is a schematic circuit diagram of the equivalent resistances for the four active gage elements of FIG. 1 connected in a Wheatstone bridge arrangement, with an external resistor in shunt with the bridge for temperature compensation.

In the pressure transducer probe assembly, the hollow bore of mounting tube 13 contains a lead stick 25, made for instance of alumina. A plurality of lead wires 26 are fastened at one end to the appropriate contact pad or strips on the integral p-type silicon pattern 11' on diaphragm 11, and at the other end to printed conductor runs 27 on lead stick 25. Lead wires 26, conductor runs 27, and another set of lead wires 28 are made of gold or other suitable metal. The pressure transducer probe assembly is mounted in a cylindrical housing or housing extension 30. At the end of housing 30 is a recess for receiving an O-ring 31 which is held in place by a removable cap 32. The use of O-ring 31 achieves a pressure-tight engagement between mounting tube 13 and the pressurized housing. The pressure differential across the unrestrained portion of diaphragm 11 causes it to flex outwardly such that outer gages 17 and 18 are subjected to compressive stresses while central gages 15 and 16 are subjected to tensile stresses. In the full bridge Wheatstone type measuring circuit shown in FIG. 3, the sign of the strain-induced resistance change, which in turn is a function of the pressure exerted on diaphragm 11, is indicated in parenthesis following the numeral designating each of the gages. Since the central gages are loaded in tension and the outer gages in compression, the resistance changes are opposite in sense and result in additive outputs in the bridge circuit. Since all four gages are active, the sensitivity is twice that obtained when only two of the gages, most commonly the two central gages, are active. The full bridge circuit shown in FIG. 3 is energized by an appropriate constant current supply 33 connected between contact pads 19a and 21a. Series resistance gage element 23 is not used in this circuit. For purposes of temperature compensation, an external shunt resistor 34 ($R_s$) is also connected between contact pads 19a and 21a. Current flows only through those p-type elements on diaphragm 11 in circuit with supply 33 due to the existence of a p-n rectifying barrier between the opposite conductivity pattern and substrate.

Figure 4:
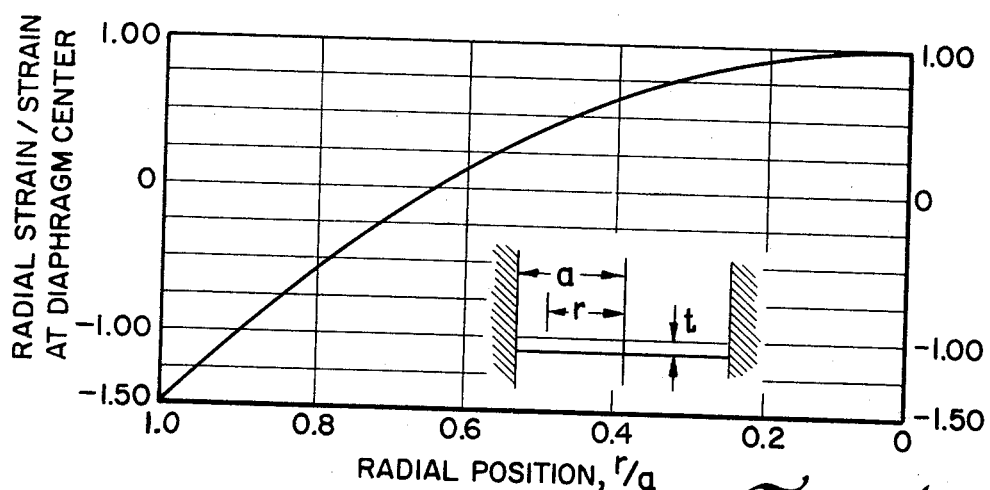
FIG. 4 is a typical radial strain characteristic for silicon diaphragms showing the relative strain with respect to the radial position of a strain gage element as indicated by the ratio $r/a$, where a is the radius of the active diaphragm.

FIG. 4 shows a typical curve of the normalized radial strain applied to a strain gage mounted on a circular diaphragm at a radial position $r/a$, where r is the radial distance from the center of the diaphragm to the center of the gage, and a is the radius of the active diaphragm. Central gages 15 and 16 mounted adjacent to or at the center of the diaphragm (the zero abscissa) are subjected to tensile strains (the ordinate is positive). Outer gages 17 and 18 are mounted toward the periphery of the active diaphragm where the $r/a$ value is such that they are subjected to compressive strains (the ordinate value is negative).

Figure 5:
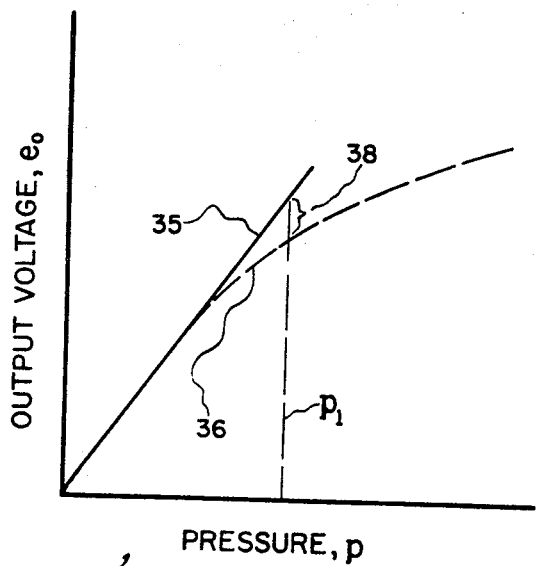
FIG. 5 illustrates output voltage-pressure characteristics for a linear output and for an uncompensated nonlinear output.

In a high quality integral silicon pressure transducer, it is desirable to have the electrical output voltage $e_o$ vary linearly with the applied pressure $p$. In FIG. 5, the linear $e_o - p$ characteristic 35 is the ideal situation. However, the actual $e_o - p$ characteristic that is obtained is nonlinear as shown at 36 because of the inherent nonlinearity of diaphragm 11 itself due to mechanical considerations. This non-linearity is present even though the strain gage elements are perfectly linear. The reader may refer for further information on this point to the article "Normal Pressure Tests of Circular Plates with Clamped Edges" by A.E. McPhersen, W. Rumberg, and S. Levy, NACA Report 744 (1942). The non-linearity of plane diaphragm 11 is generally negative, and can best be described as being caused by membrane stresses generated in the neutral plane when the deflection of the center exceeds approximately 1/5 of the diaphragm thickness. This becomes an important consideration when the diaphragm is designed to measure low pressures and significant deflection is necessary to generate the required strains. The amount of non-linearity of the output voltage at the pressure $p_1$ in FIG. 5 is indicated by the bracket 38. The magnitude of the non-linearity in output voltage due to this cause is a direct function of the ratio $y_o/t$, where $y_o$ is the deflection of the diaphragm center and $t$ is the diaphragm thickness. The linearization technique described here applies only to those diaphragms in which the ratio $y_o/t$ is small resulting in non-linearity of less than 1 percent.

In accordance with the invention, a fine adjustment for linearity control of the output voltage is obtained by utilizing the interaction between the mechanical characteristics of the diaphragm and the variation in bridge resistance due to pressure. The variation in bridge resistance with pressure is selected to produce a change in output voltage to compensate for the inherent non-linearity of the diaphragm. Since the diaphragm exhibits negative non-linearity, the bridge resistance is made to change with applied pressure by a controlled amount to effect compensation on the level of ±0.5 percent of the full scale pressure range. The controlled change in bridge resistance is obtained by changing the radius $a$ of the active diaphragm within certain limits. This is achieved conveniently in the integral silicon pressure transducer probe assembly shown in FIG. 2 simply by changing the inside diameter of mounting tube 13. The selected active diaphragm diameter for a particular strain gage pattern depends upon the pressure range to be gaged and hence the $a/t$ ratio of the diaphragm.

Figure 6:
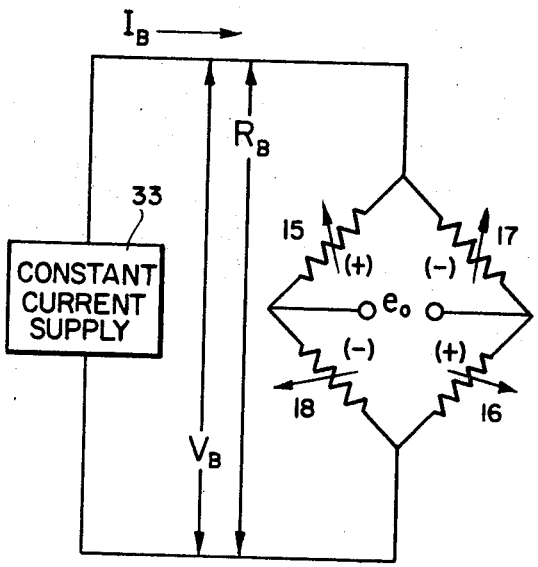
FIG. 6 is a schematic circuit diagram similar to FIG. 3 of a Wheatstone bridge energized by a constant current supply.

To facilitate an explanation of the theory and application of the invention, the simplified bridge circuit shown in FIG. 6 is used. If the gage factor (GF) of a strain gage is defined as being equal to the change of resistance ($\Delta R/R$) divided by the applied strain ($\epsilon$), then:

$$\Delta R/R = GF \cdot \epsilon . \tag{1}$$

For an integral silicon diaphragm with a full bridge circuit with four active strain gages, two centrally located on the diaphragm and two toward the edge, the variation in bridge resistance ($R_B$) with applied pressure is:

$$R_B = R_{Bo} [1 + (GF)/2 (\epsilon_i + \epsilon_o)] \tag{2}$$

where $R_{Bo}$ is the bridge resistance at zero pressure, and $\epsilon_i$ and $\epsilon_o$ are the average strains experienced by the inner (central) and outer gages respectively. When such a bridge is operated with a constant current supply ($I_B$), the relation $V_B = I_B R_B$ applies, where $V_B$ is the bridge voltage. Thus, the bridge voltage is proportional to $R_B$, as is the output voltage $e_o$, i.e., $$e_o = V_B K_p \tag{3}$$

where $= I_B R_B K_p$ where K is a proportionally constant and $p$ is the pressure. Referring to equations (2) and (3), it is seen that with a constant current supply to the bridge, variations in $R_B$ with pressure produce a nonlinear output voltage even though the diaphragm and strain gage elements are linear (the diaphragm is in fact not linear as previously discussed). The magnitude of this effect is controlled by the ($\epsilon_i + \epsilon_o$) term of equation (2). When $\epsilon_o = -\epsilon_i$ and this term is 0, $R_B$ is constant and no delinearization occurs. When ($\epsilon_i + \epsilon_o$) is positive, the output voltage has positive nonlinearity (the $e_o - p$ characteristic is concave upwardly), and when ($\epsilon_i + \epsilon_o$) is negative the output voltage has negative non-linearity (the characteristic is concave downward.)

The magnitude of the term ($\epsilon_i + \epsilon_o$) is predictable and controllable, as can be seen from an examination of FIG. 4. The two central strain gages 15 and 16 are fixed near the center of the diaphragm and experience an average strain value corresponding to the $r/a = 0$ position. The $r/a$ position of the outer strain gages 17 and 18, however, can be preselected and has a range of possible values with the only limitations that $r/a$ exceeds 0.62 and that the entire gage is within the perimeter of the active diaphragm of radius $a$. The inner limit of $r/a = 0.62$ marks the point at which the strain applied to the outer gages, if mounted there, is zero so that the term ($\epsilon_i + \epsilon_o$) has its maximum positive value. To obtain $\epsilon_i = -\epsilon_o$, the centers of the outer gages are located such that $r/a$ is approximately 0.90 for the particular characteristic given in FIG. 4. At values of $r/a$ exceeding approximately 0.90, $\epsilon_o$ is greater than $\epsilon_i$ and the term ($\epsilon_i + \epsilon_o$) is negative. This is not desirable from the standpoint of the present invention, in view of the fact that the inherent diaphragm non-linearity due to mechanical considerations is a negative non-linearity (FIG. 5). Thus, it is desired to increase the output voltage as a function of pressure to compensate for the decrease in output voltage caused by diaphragm non-linearity.

Although in the foregoing discussion the control of s-train levels and the strain differential ($\epsilon_i + \epsilon_o$) is emphasized, it should be understood that in terms of the bridge circuit and the electrical output voltage of the bridge circuit, it is the variation in the bridge resistance $R_B$ with pressure that is controlled to achieve a fine adjustment for linearity control of integral silicon pressure transducers. In simple terms, referring to equation (3), the output voltage $e_o$ due to mechanical diaphragm non-linearity decreases as a function of pressure, and the bridge resistance $R_B$ according to the invention increases as a function of pressure to thereby obtain a more linear output voltage. The amount of bridge resistance change is selected by adjusting the relative position of the outer gages 17 and 18 with respect to the edges or center of the active diaphragm, that is, selecting the radial position of the gages to achieve the desired amount of compensation. The magnitude of the change in bridge resistance is relatively small and can be calculated by computing $\Delta R$ using equation (2) with typical values of gage factor and strain. The maximum compensation is no greater than ±0.5 percent of the full scale pressure range. Fine linearity control as herein taught can be obtained, of course, by fixing the radius $a$ of the unrestrained diaphragm and forming the outer gages 17 and 18 at different $r/a$ radial positions according to the particular application. The preferred technique already discussed with regard to FIGS. 1 and 2 is to use a single p-type silicon pattern with a fixed radial separation between inner and outer gages, and to adjust the radius $a$ of the unrestrained diaphragm to effect variable radial positioning of the outer gages. Thus, changing the radius a of the unrestrained diaphragm between the limits 12a and 12c shown in dashed lines in FIG. 1 changes the radial positions of the centers 17a and 18a of the outer gages 17 and 18 with respect to the center of the diaphragm.

By way of example of the practice of the invention, integral silicon diaphragm 11 in FIG. 1 is 182 mils square. The active length of the elongated strips in central gages 15 and 16 is 22 mils, while the corresponding dimension in outer gages 17 and 18 is 10.5 mils. The radial distance between outer gage centers 17a and 18a and the center of the diaphragm is 32 mils. The normal unrestrained diaphragm diameter indicated in dashed lines at 12b is 80 mils. With the given mask design, the average strains experienced by outer gages 17 and 18 is readily controlled by choice of the inner diameter of the tube 13 (FIG. 2) on which it is mounted. From available information on strain distribution across such a diaphragm, it can be shown that ($\epsilon_i + \epsilon_o$) varies as follows as the I.D. of the mounting tube is varied from its normal 80 mils.

Table 1

Bridge Resistance Change vs. Mounting Tube Diameter

| Radius (a) (mils) | $(\epsilon_i + \epsilon_o)/\epsilon_i$ | $\Delta R_B$ (percent) |
|---|---|---|
| 35.6 | 0 | 0 |
| 37.0 | 0.155 | 0.19 |
| 38.0 | 0.250 | 0.31 |
| 40.0 | 0.440 | 0.55 |
| 42.0 | 0.585 | 0.73 |
| 44.0 | 0.710 | 0.89 |

When the strain gage bridge is operated from a constant current supply, the change in $R_B$ indicated causes a corresponding change in output signal. For the more common arrangement, not here shown, which utilizes a battery and a fixed resistance shunt of $R_{B/2} < R_s < R_B$, the effect of variations in $R_B$ on non-linearity are typically reduced to one-half to three-quarters of the change in $R_B$. Thus, for an 80 mil mount it is an approximately ±0.50 percent effect.

The foregoing integral silicon pressure transducer fabricated using a diaphragm with a small $a/t$ ratio is suitable for the gaging of pressures with a maximum range of 0–400 psi and a minimum range of 0–30 psi. Since the negative non-linearity in output voltage due to the inherent diaphragm non-linearity is a function of pressure range (viz., $a/t$ ratio), it can be compensated by a judicious choice of I.D. of mounting tube 13. An integral silicon diaphragm for a range of 0–150 psi exhibits a negative non-linearity that is nicely compensated for by mounting on an 80 mil I.D. tube. Higher pressure ranges exhibit this negative non-linearity to a lesser degree and require a smaller I.D. mount. The highest ranges 0–400 psi or higher are essentially linear and can be mounted on 72 mil I.D. tubes. The minimum unrestrained diaphragm diameter is indicated by the dashed line 12a. In similar fashion, pressure ranges lower than 150 psi to a minimum of 0–30 psi exhibit a greater degree of negative non-linearity and are mounted on tubes with a larger I.D. than 80 mils. The maximum unrestrained diaphragm diameter shown at 12c is about 105 mils and represents the limiting diameter where zero tensile strain contribution by outer gages 17 and 18 occurs and hence maximum bridge resistance change occurs as indicated by equation (2) at a level of approximately 1 1/4 percent.

The invention is also applicable to the skewed arrangement of the central and outer gages on an integral silicon diaphragm as illustrated in U.S. Pat. No. 3,537,319 granted Nov. 3, 1970 to the present inventor, and assigned to the same assignee. In this mask pattern, the central and outer strain gages have different crystallographic orientations for optimum sensitivity. This patent may be referred to for further information in view of the fact that integral silicon diaphragm 11 is similar to the one described in the patent. Moreover, fine linearity control as here set forth is applicable in a broader sense to the half bridge circuit arrangement using only one central and outer gage as shown in FIG. 5 of this patent.

In summary, a fine adjustment for linearity control of the electrical output voltage of integral silicon pressure transducers with central and outer active strain gages connected in a bridge circuit is obtained by adjusting the relative radial position of the outer gage or gages. The change in bridge resistance results in a change of output voltage that compensates to a large extent for the inherent non-linearity in output voltage due to mechanical considerations as the diaphragm flexes, at the level of ±0.5 percent of full range pressure. The adjustment is simple and effective and results in high quality transducers.

While the invention has been particularly shown and described with reference to a preferred embodiment thereof, it will be understood by those skilled in the art that the foregoing and other changes in form and details may be made therein without departing from the spirit and scope of the invention.

What I claim as new and desire to secure by Letters Patent is:

1. An integral silicon pressure transducer comprising:
   a circular, restrained edge silicon diaphragm that develops bending stresses in response to applied pressure and has a preselected radius, said diaphragm having an inherent mechanical nonlinearity with applied pressure,
   a plurality of strain gages formed integrally on said diaphragm including at least one central gage subject to tensile strain and one outer gage subject to compressive strain, and
   circuit means for connecting said strain gages in a resistance bridge circuit that generates an output voltage as a measure of the applied pressure,
   said outer gage being located at a radial position on said diaphragm to produce a predetermined nonlinear bridge resistance variation with applied pressure to compensate for the inherent mechanical nonlinearity of said diaphragm, so as to thereby generate a substantially linear output voltage.

2. A pressure transducer according to claim 1 in which the difference between the strains experienced by said central and outer gages determines the nonlinear bridge resistance variation and has a selected positive value.

3. A pressure transducer according to claim 2 further including a mounting member with an internal bore to which the edges of said silicon diaphragm are secured.

4. A pressure transducer according to claim 2 in which said central and outer gages have a fixed pattern and radial separation, and
   the diaphragm radius is variable according to the pressure range being measured.

5. An integral silicon pressure transducer comprising:
a circular single crystal *n*-type silicon diaphragm that develops bending stresses and has an inherent mechanical nonlinearity with applied pressure, and a mounting member restraining the edges of said diaphragm at a preselected radius, a fixed *p*-type silicon pattern formed integrally on one surface of said diaphragm including a pair of central strain gages that are symmetrical with the center of said diaphragm and subject to tensile strain and a pair of diametrically spaced outer strain gages subject to compressive strain, said *p*-type pattern further including low resistance areas connecting said strain gages as a resistance bridge circuit, contact pads for connection of a source of energy, and other contact pads for detecting the output voltage of said bridge circuit, said preselected radius locating said outer gages at radial positions on said diaphragm to produce a predetermined nonlinear bridge resistance variation with applied pressure to compensate for the inherent mechanical nonlinearity of said diaphragm, so as to thereby generate a substantially linear output voltage.

6. A pressure transducer according to claim 5 in which the difference between the strain experienced by one of said central gages and the strain experienced by one of said outer gages determines the bridge resistance variation and has a positive value.

7. A pressure transducer according to claim 6 in which said mounting member is a tube with an inside diameter corresponding to double the preselected diaphragm radius.

8. A pressure transducer according to claim 7 in which the inside diameter of the mounting tube and diaphragm radius are variable according to the pressure range being measured.

* * * * *